United States Patent
Zhong et al.

(10) Patent No.: US 10,673,960 B2
(45) Date of Patent: Jun. 2, 2020

(54) METHOD AND APPARATUS FOR DETERMINING GATEWAY INFORMATION

(71) Applicant: Huawei Technologies Co., Ltd., Shenzhen, Guangdong (CN)

(72) Inventors: Yu Zhong, Beijing (CN); Ruchuan Du, Shanghai (CN); Caixia Qi, Shanghai (CN); Yangming Lv, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 165 days.

(21) Appl. No.: 15/625,346

(22) Filed: Jun. 16, 2017

(65) Prior Publication Data
US 2017/0289279 A1 Oct. 5, 2017

Related U.S. Application Data (63) Continuation of application No. PCT/CN2014/094134, filed on Dec. 17, 2014.

(51) Int. Cl.
*H04L 9/08* (2006.01)
*H04L 29/08* (2006.01)
(Continued)

(52) U.S. Cl.
CPC .......... *H04L 67/16* (2013.01); *H04L 61/1511* (2013.01); *H04L 61/1541* (2013.01);
(Continued)

(58) Field of Classification Search
CPC ....................................................... H04L 67/16
(Continued)

(56) References Cited

U.S. PATENT DOCUMENTS

| 6,549,776 B1* | 4/2003 | Joong ..................... H04L 29/06 370/467 |
| 6,950,876 B2* | 9/2005 | Bright ............... H04L 29/12188 370/465 |

(Continued)

FOREIGN PATENT DOCUMENTS

| CN | 1744543 A | 3/2006 |
| CN | 101808308 A | 8/2010 |
| CN | 103701954 A | 4/2014 |

OTHER PUBLICATIONS

Onyeajuwa, "Workshop on numbering planning and convergence of numbering", "Recommendation E.164-E.169", 2010 (Year: 2010).*

(Continued)

*Primary Examiner* — Ondrej C Vostal
(74) *Attorney, Agent, or Firm* — Womble Bond Dickinson (US) LLP (57) ABSTRACT

Embodiments of the present disclosure provide a method and an apparatus for determining gateway information. A first device obtains first information of user equipment, where the first information of the user equipment is used to indicate an area in which the user equipment subscribes to a service, and the first device determines gateway information corresponding to a first domain name, where the first domain name includes the first information of the user equipment. The first domain name includes the first information of the user equipment, and the first information is used to indicate the area in which the user equipment subscribes to the service. Compared with a method in which a number segment is used to generate a domain name, this reduces a quantity of domain names that need to be configured and maintained, and reduces maintenance costs of an operator.

16 Claims, 2 Drawing Sheets

(51) Int. Cl.
    *H04L 29/12* (2006.01)
    *H04W 8/02* (2009.01)
    *H04W 92/02* (2009.01)
(52) U.S. Cl.
    CPC ........ *H04L 61/303* (2013.01); *H04L 61/3025* (2013.01); *H04W 8/02* (2013.01); *H04W 92/02* (2013.01)
(58) Field of Classification Search
    USPC ........................................................ 709/220
    See application file for complete search history.

(56) References Cited

U.S. PATENT DOCUMENTS

| | | | | |
|---|---|---|---|---|
| 6,981,029 | B1* | 12/2005 | Menditto | H04L 29/12113 709/217 |
| 7,103,647 | B2* | 9/2006 | Aziz | H04L 29/06 709/220 |
| 7,330,728 | B1* | 2/2008 | Moll | H04W 4/029 455/456.3 |
| 7,457,279 | B1* | 11/2008 | Scott | H04L 45/02 370/352 |
| 8,234,650 | B1* | 7/2012 | Eppstein | G06F 9/5072 709/220 |
| 2004/0100974 | A1* | 5/2004 | Kreiner | H04L 12/2856 370/401 |
| 2005/0073982 | A1* | 4/2005 | Corneille | H04L 29/12066 370/338 |
| 2005/0233740 | A1* | 10/2005 | Jiang | H04W 4/24 455/432.1 |
| 2007/0061334 | A1* | 3/2007 | Ramer | H04L 67/16 |
| 2007/0254648 | A1* | 11/2007 | Zhang | H04L 29/06027 455/433 |
| 2007/0293216 | A1* | 12/2007 | Jiang | H04W 4/12 455/433 |
| 2008/0039104 | A1* | 2/2008 | Gu | H04W 8/04 455/445 |
| 2008/0076420 | A1* | 3/2008 | Khetawat | H04W 8/04 455/435.1 |
| 2008/0189774 | A1* | 8/2008 | Ansari | G06Q 30/04 726/7 |
| 2009/0170519 | A1* | 7/2009 | Wilhoite | H04M 3/42246 455/436 |
| 2010/0124228 | A1* | 5/2010 | Tinnakornsrisuphap | H04W 76/12 370/392 |
| 2010/0235433 | A1* | 9/2010 | Ansari | G06Q 30/04 709/203 |
| 2010/0318554 | A1* | 12/2010 | Walker | H04L 63/029 707/769 |
| 2014/0003233 | A1* | 1/2014 | Rune | H04L 47/125 370/230 |
| 2014/0089478 | A1* | 3/2014 | Seed | H04W 4/70 709/222 |
| 2014/0274167 | A1* | 9/2014 | Varonen | H04L 67/18 455/457 |
| 2015/0282221 | A1* | 10/2015 | Foti | H04W 4/70 455/517 |

OTHER PUBLICATIONS

Wikipedia, "E.164", 2020 (Year: 2020).*
Anonymous, "DNS Tricks in "PGW Selection" Process", Ramki—Expert Opinion—LTE University, Mar. 28, 2013, 4 pages, XP055526139.
"3rd Generation Partnership Project; Technical Specification Group Services and System Aspects; General Packet Radio Service (GPRS); Service description; Stage 2 (Release 13)", 3GPP TS 23.060 V13.0.0, Sep. 2014, 350 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.6.0, Sep. 2014, 306 pages.
"3rd Generation Partnership Project;Technical Specification Group Core Network and Terminals;Numbering, addressing and identification(Release 12)" ; 3GPP TS 23.003 V12.4.1; Oct. 2014; 90 pages.

* cited by examiner

METHOD AND APPARATUS FOR DETERMINING GATEWAY INFORMATION

CROSS-REFERENCE TO RELATED APPLICATIONS

This application is a continuation of International Application No. PCT/CN2014/094134, filed on Dec. 17, 2014, the disclosure of which is hereby incorporated by reference in its entirety.

TECHNICAL FIELD

Embodiments of the present application relate to communications technologies, and in particular, to a method and an apparatus for determining gateway information.

BACKGROUND

When user equipment roams from a home location to a roaming location (the home location refers to an area in which the user equipment subscribes to a service, and the roaming location refers to an area, beyond the home location, in which the user equipment currently is located), if the user equipment uses a voice service, a data service, and the like in the roaming location, because of charging and service management, a Mobility Management Entity (MME), a Serving GPRS Support Node (SGSN), and the like in the roaming location usually need to control a related service to return to a home gateway, and the home gateway performs specific charging, service management, and the like. Gateway information of the home gateway of the user equipment needs to be first determined, so that the MME or the SGSN returns the service of the user equipment to the home gateway.

In the prior art, a domain name is generated according to a number segment of the user equipment, and the gateway information of the home gateway is determined according to a correspondence between a domain name and gateway information. Because of a large quantity of user equipments and excessive number segments of the user equipments, a Domain Name Server (DNS), a local host file of the MME, or a local host file of the SGSN needs to configure and maintain domain names including all number segments, and consequently maintenance costs of an operator are high.

SUMMARY

Embodiments of the present disclosure provide a method and an apparatus for determining gateway information, so as to reduce maintenance costs of an operator.

A first aspect of embodiments of the present disclosure provides a method for determining gateway information, including:

obtaining, by a first device, first information of user equipment, where the first information of the user equipment is used to indicate an area in which the user equipment subscribes to a service; and determining, by the first device, gateway information corresponding to a first domain name, where the first domain name includes the first information of the user equipment, and the gateway information is used to indicate a gateway in the area.

With reference to the first aspect, in a first possible implementation manner, the determining, by the first device, gateway information corresponding to a first domain name includes:

performing, by the first device, query in a first correspondence according to the first domain name, where a result of the query is the gateway information corresponding to the first domain name, and the first correspondence includes a correspondence between the first domain name and the gateway information.

With reference to the first possible implementation manner, in a second possible implementation manner, the first correspondence is stored in the first device.

With reference to the first aspect, in a third possible implementation manner, the determining, by the first device, gateway information corresponding to a first domain name includes:

sending, by the first device, the first domain name to a domain name server DNS; and receiving, by the first device, the gateway information that is corresponding to the first domain name and that is sent by the DNS, where the DNS stores a correspondence between the first domain name and the gateway information.

With reference to any one of the first aspect, or the first to the third possible implementation manners of the first aspect, in a fourth possible implementation manner, the obtaining, by a first device, first information of user equipment includes:

obtaining, from a second device by the first device, the first information of the user equipment, where the second device is configured to store the first information.

With reference to any one of the first aspect, or the first to the third possible implementation manners of the first aspect, in a fifth possible implementation manner, the obtaining, by a first device, first information of user equipment includes:

obtaining, by the first device, device information of a second device, and obtaining the first information of the user equipment according to the device information of the second device.

With reference to the fifth possible implementation manner, in a sixth possible implementation manner, the device information of the second device is a host name of the second device or a number of the second device, and the first information is area information in the host name of the second device or an area code in the number of the second device.

With reference to any one of the first aspect, or the first to the sixth possible implementation manners of the first aspect, in a seventh possible implementation manner, the first device is a mobility management entity MME, a serving general packet radio service support node SGSN, a high rate packet data serving gateway HSGW, a transparent gateway TGW, a serving gateway SGW, or a packet gateway PGW.

With reference to anyone of the fourth to the seventh possible implementation manners of the first aspect, in an eighth possible implementation manner, the second device is a home location register HLR, a home subscriber server HSS, an authentication, authorization and accounting AAA server, a policy and charging rules function PCRF unit, or an online charging system OCS.

With reference to any one of the first aspect, or the first to the eighth possible implementation manners of the first aspect, in a ninth possible implementation manner, the gateway information includes an identifier of the gateway, and the first information of the user equipment includes an index of a first-level administrative region including the area.

A second aspect of embodiments of the present disclosure provides a method for determining gateway information, including:

receiving, by a third device, a first domain name of user equipment, where the first domain name includes first information of the user equipment, and the first information is used to indicate an area in which the user equipment subscribes to a service; and determining, by the third device, gateway information corresponding to the first domain name, where the gateway information is used to indicate a gateway in the area.

With reference to the second aspect, in a first possible implementation manner, the determining, by the third device, gateway information corresponding to the first domain name includes:

performing, by the third device, query in a first correspondence according to the first domain name, where a result of the query is the gateway information corresponding to the first domain name, the first correspondence includes a correspondence between the first domain name and the gateway information, and the first correspondence is stored in the third device.

With reference to the second aspect or the first possible implementation manner, in a second possible implementation manner, the third device is a domain name server DNS.

With reference to the second aspect or the first or the second possible implementation manner, in a third possible implementation manner, the gateway information includes an identifier of the gateway, and the first information of the user equipment includes an index of a first-level administrative region including the area.

A third aspect of embodiments of the present disclosure provides an apparatus for determining gateway information, including:

an obtaining module, configured to obtain first information of user equipment, where the first information of the user equipment is used to indicate an area in which the user equipment subscribes to a service; and a processing module, configured to determine gateway information corresponding to a first domain name, where the first domain name includes the first information of the user equipment, and the gateway information is used to indicate a gateway in the area.

With reference to the third aspect, in a first possible implementation manner, the processing module is specifically configured to perform query in a first correspondence according to the first domain name, where a result of the query is the gateway information corresponding to the first domain name, and the first correspondence includes a correspondence between the first domain name and the gateway information.

With reference to the first possible implementation manner, in a second possible implementation manner, the apparatus further includes:

a storage module, configured to store the first correspondence.

With reference to the third aspect, in a third possible implementation manner, the processing module is specifically configured to: send the first domain name to a domain name server DNS, and receive the gateway information that is corresponding to the first domain name and that is sent by the DNS, where the DNS stores a correspondence between the first domain name and the gateway information.

With reference to any one of the third aspect, or the first to the third possible implementation manners of the third aspect, in a fourth possible implementation manner, the obtaining module is specifically configured to obtain the first information of the user equipment from a second device, where the second device is configured to store the first information.

With reference to any one of the third aspect, or the first to the third possible implementation manners of the third aspect, in a fifth possible implementation manner, the obtaining module is specifically configured to: obtain device information of a second device, and obtain the first information of the user equipment according to the device information of the second device.

With reference to the fifth possible implementation manner, in a sixth possible implementation manner, the device information of the second device is a host name of the second device or a number of the second device, and the first information is area information in the host name of the second device or an area code in the number of the second device.

With reference to any one of the third aspect, or the first to the sixth possible implementation manners of the third aspect, in a seventh possible implementation manner, the apparatus for determining gateway information is deployed in a mobility management entity MME, a serving general packet radio service support node SGSN, a high rate packet data serving gateway HSGW, a transparent gateway TGW, a serving gateway SGW, or a packet gateway PGW.

With reference to anyone of the fourth to the seventh possible implementation manners of the third aspect, in an eighth possible implementation manner, the second device is a home location register HLR, a home subscriber server HSS, an authentication, authorization and accounting AAA server, a policy and charging rules function PCRF unit, or an online charging system OCS.

With reference to any one of the third aspect, or the first to the eighth possible implementation manners of the third aspect, in a ninth possible implementation manner, the gateway information includes an identifier of the gateway, and the first information of the user equipment includes an index of a first-level administrative region including the area.

A fourth aspect of embodiments of the present disclosure provides an apparatus for determining gateway information, including:

a receiving module, configured to receive a first domain name of user equipment, where the first domain name includes first information of the user equipment, and the first information is used to indicate an area in which the user equipment subscribes to a service; and a processing module, configured to determine gateway information corresponding to the first domain name, where the gateway information is used to indicate a gateway in the area.

With reference to the fourth aspect, in a first possible implementation manner, the processing module is configured to perform query in a first correspondence according to the first domain name, where a result of the query is the gateway information corresponding to the first domain name, the first correspondence includes a correspondence between the first domain name and the gateway information, and the first correspondence is stored in the third device.

With reference to the fourth aspect or the first possible implementation manner, in a second possible implementation manner, the apparatus for determining gateway information is deployed in a domain name server DNS.

With reference to the fourth aspect or the first or the second possible implementation manner, in a third possible implementation manner, the gateway information includes an identifier of the gateway, and the first information of the user equipment includes an index of a first-level administrative region including the area.

According to the method and the apparatus for determining gateway information provided in the embodiments of the present disclosure, a first device obtains first information of user equipment, where the first information of the user equipment is used to indicate an area in which the user equipment subscribes to a service, and the first device determines gateway information corresponding to a first domain name, where the first domain name includes the first information of the user equipment. The first domain name includes the first information of the user equipment, and the first information is used to indicate the area in which the user equipment subscribes to the service. Compared with a method in which a number segment is used to generate a domain name, this reduces a quantity of domain names that need to be configured and maintained, and reduces maintenance costs of an operator.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

A domain name is generated according to a number segment of user equipment, and gateway information is determined according to a correspondence between the domain name and the gateway information. Generally, a DNS stores the correspondence between the domain name and the gateway information, or a local host file of an MME stores the correspondence between the domain name and the gateway information, or a local host file of an SGSN stores the correspondence between the domain name and the gateway information. The MME or the SGSN may determine the gateway information of the user equipment by using the correspondence between the domain name and the gateway information. The domain name is a name that is of a specific gateway or a set of gateways (a gateway pool) in a network and that includes a string of dot-separated names. For example, the domain name includes a number segment of the user equipment, a network identifier, an operator, a country code, a network type, and the like, such as 1862107.3gnet.mnc002.mcc460.gprs. When determining the gateway information of the user equipment, the MME or the SGSN searches for the DNS, or the local host file of the MME, or the local host file of the SGSN by using the domain name, and then determines the gateway information corresponding to the domain name according to the correspondence between the domain name and the gateway information stored in the DNS, the local host file of the MME, or the local host file of the SGSN. Specifically, the number segment may be a network identification number and a region code. For example, in China, the first three digits in a number are the network identification number, and the fourth to the seventh digits are the region code. This is not limited in the present disclosure. However, the domain name is generated according to the number segment of the user equipment, and the gateway information is determined according to the correspondence between the domain name and the gateway information. Due to a large quantity of user equipments and excessive number segments of the user equipments, a domain name including all number segments needs to be configured and maintained in the DNS, the local host file of the MME, or the local host file of the SGSN, and consequently maintenance costs of an operator are high.

To resolve the foregoing problem, in the embodiments of the present disclosure, a domain name is generated mainly by changing an element constituting the domain name and according to information about an area in which the user equipment subscribes to a service, so as to optimize a constitution of the domain name and reduce a quantity of domain names that need to be configured and maintained, thereby reducing maintenance costs of an operator.

Figure 1:
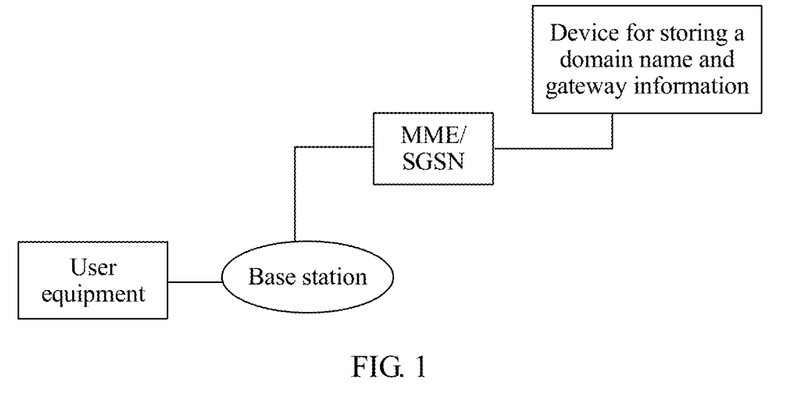
FIG. 1 is a schematic diagram of a 3GPP network architecture according to the present disclosure.

A method in the embodiments of the present disclosure may be applied to a 3GPP network, or may be applied to a non-3GPP network. A 3GPP network architecture is shown in FIG. 1. FIG. 1 is a schematic diagram of a 3GPP network architecture according to the present disclosure. After user equipment accesses abase station in a roaming location, the base station sends a control message of the user equipment to an MME or an SGSN in the roaming location. The MME or the SGSN obtains home location information of the user equipment, sends a domain name of the user equipment to a device for storing the domain name and gateway information, where the domain name of the user equipment includes an area in which the user equipment subscribes to a service, and obtains gateway information corresponding to the domain name. The MME or the SGSN returns the service to a gateway (that is, a gateway in the area in which the user equipment subscribes to the service) corresponding to the domain name, so that the gateway in the area in which the user equipment subscribes to the service provides a service such as charging and service management for the user equipment. In the non-3GPP network, a workflow is similar to that in the 3GPP network. A difference is that the MME or the SGSN executes the workflow in the 3GPP network, but a High Rate Packet Data Serving Gateway (HSGW)/ Transparent Gateway (TGW) executes the workflow in the non-3GPP network, and in a scenario in which a Serving Gateway (SGW)/Packet Gateway (PGW) serves as an agent, the SGW or the PGW executes the workflow. It may be understood by persons skilled in the art that the methods in the embodiments of the present disclosure may be applied to different scenarios. In different scenarios, the method in each embodiment of the present disclosure is executed by a different network element, and implementation principles and technical effects of the methods are similar and are not described in detail one by one in the present disclosure. The application scenario is not limited in the present disclosure.

Specific embodiments are used below to describe in detail the technical solutions of the present disclosure. The following several specific embodiments may be combined with each other, and a same or similar concept or process may not be described repeatedly in some embodiments.

Figure 2:
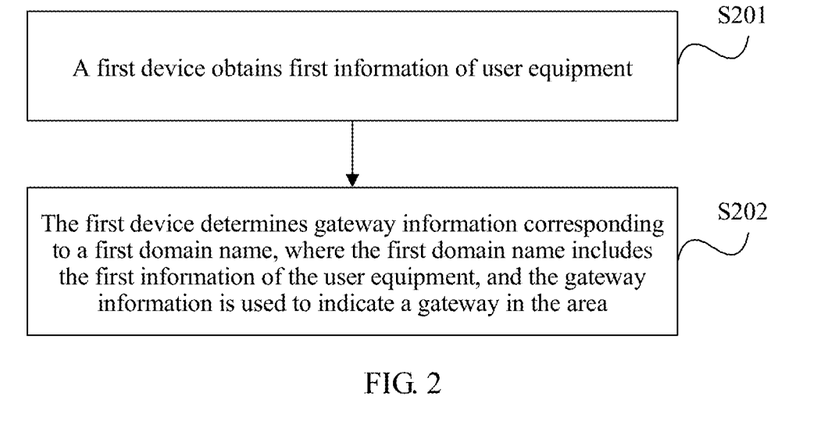
FIG. 2 is a schematic flowchart of Embodiment 1 of a method for determining gateway information according to the present disclosure.

FIG. 2 is a schematic flowchart of Embodiment 1 of a method for determining gateway information according to the present disclosure. The method in this embodiment is executed by a first device. In a 3GPP network, the first device is an MME or an SGSN. In a non-3GPP network, the first device is an HSGW or a TGW. In a scenario in which an SGW or a PGW serves as an agent, the first device is the SGW or the PGW. In another scenario, the first device is a corresponding network element. This is not limited in the present disclosure. As shown in FIG. 2, the method in this embodiment is as follows:

S201. The first device obtains first information of user equipment.

The first information of the user equipment is used to indicate an area in which the user equipment subscribes to a service.

A manner of obtaining the first information of the user equipment by the first device includes but is not limited to the following feasible implementation manners.

A first feasible implementation manner is that the first device obtains, from a second device, the first information of the user equipment, where the second device is configured to store the first information.

The second device may be a Home Location Register (HLR), a Home Subscriber Server (HSS), an Authentication, Authorization and Accounting (AAA) server, a Policy and Charging Rules Function, (PCRF) unit, or an online charging system (OCS), or another device for storing user subscription information.

Specifically, in the 3GPP network, the first information of the user equipment may be obtained by the MME or the SGSN from the HLR, the HSS, the AAA server, the PCRF, or the OCS, or may be locally configured by the MME/ SGSN, or may be obtained from an operation and maintenance center.

In the non-3GPP network, the first information of the user equipment may be obtained by the HSGW/TGW from the AAA server or the PCRF, or may be locally configured by the HSGW/TGW, or may be obtained from an operation and maintenance center.

In the service scenario in which the SGW/PGW serves as an agent, the first information of the user equipment may be obtained by the SGW/PGW from the OCS, the AAA server, or the PCRF, or may be locally configured by the SGW/ PGW, or may be obtained from an operation and maintenance center.

In the foregoing three scenarios, the operation and maintenance center refers to an operation center, a server in an operation center, or a server in a charging center.

A second feasible implementation manner is that the first device obtains device information of a second device, and obtains the first information of the user equipment according to the device information of the second device.

The device information of the second device is a host name of the second device or a number of the second device, and the first information is area information in the host name of the second device or an area code in the number of the second device.

For example, the second device is the HSS. The device information of the second device is a host name of the HSS, and the first information is area information in the host name of the HSS, for example, the host name of the HSS may be "<number>.<prefecture>.<province>.hss.epc. mnc002.mcc.460.3gpp3Gp pnetwork.org". Both "<prefecture>" and "<province>" are area information, and "<province>" may be independently used as the first information, or "<prefecture>.<province>" may be used as the first information. A specific field of the first information in the host name of the HSS, or whether the host name of the HSS further includes other information, or the like is not limited in the present disclosure.

For example, the second device is the HLR. The device information of the second device is a number of the HLR. The number of the HLR uses an E.164 (International PSTN/ ISDN numbers) encoding manner, and an encoding format is: country code (CC)+national destination code (NDC)+ locally significant part (LSP).

The CC identifies a country in which user equipment (MS) is registered; the NDC identifies a public land mobile network (PLMN) corresponding to the user equipment, and an operator of the user equipment may be identified according to the information; the LSP uses an area-encoding manner that is jointly negotiated and determined by the operator and a numbering organization of a country in which a network of the operator is located, that is, the operator of the user equipment may be determined according to the NDC, and an area in which the user equipment subscribes to a service may be determined according to the LSP. Therefore, the NDC+LSP in the number of the HLR is the area code in the number of the second device.

In the foregoing embodiment, the first information of the user equipment includes an index of a first-level administrative region including the area. Generally, an area in which user equipment subscribes to a service is divided by an operator according to an administrative region in the area (country). For example, in China, an area in which user equipment subscribes to a service is generally a provincial-level administrative region (that is, the first-level administrative region described above) or a prefectural-level administrative region (generally, a second-level administrative region). Alternatively, an area in which user equipment subscribes to a service may be divided by an operator according to a quantity of subscribers, and if a quantity of subscribers in an area reaches a relatively large threshold, the area may be the area in which the user equipment subscribes to a service. This is not limited in the present disclosure. Therefore, in the prior art, due to a large quantity of user equipments, excessive number segments of the user equipments, and excessive domain names generated according to the number segments of the user equipments in an area in which user equipment subscribes to a service, a domain name including all number segments needs to be configured and maintained in a DNS, a local host file of an MME, or a local host file of an SGSN, and maintenance costs of an operator are high.

S202. The first device determines gateway information corresponding to a first domain name, where the first domain name includes the first information of the user equipment, and the gateway information is used to indicate a gateway in the area.

A method for determining the gateway information corresponding to the first domain name by the first device includes but is not limited to the following manners.

A first feasible implementation manner is that the first device performs query in a first correspondence according to the first domain name, where a result of the query is the gateway information corresponding to the first domain name, and the first correspondence includes a correspondence between the first domain name and the gateway information. The first correspondence is stored in the first device.

A second feasible implementation manner is that the first device sends the first domain name to the DNS; and the first device receives gateway information that is corresponding to the first domain name and that is sent by the DNS, where the DNS stores a correspondence between the first domain name and the gateway information.

In the first feasible implementation manner or the second feasible implementation manner, the gateway information may be an IP address of a gateway in the area in which the user equipment subscribes to the service, a device name of a gateway in the area in which the user equipment subscribes to the service, an identifier of a gateway in the area in which the user equipment subscribes to the service, or the like. This is not limited in the present disclosure.

Accordingly, the first correspondence may be specifically a correspondence between the first domain name and the IP address of the gateway in the area in which the user equipment subscribes to the service, a correspondence between the first domain name and the device name of the gateway in the area in which the user equipment subscribes to the service, a correspondence between the first domain name and the identifier of the gateway in the area in which the user equipment subscribes to the service, or the like, provided that the first domain name can correspond, by using the correspondence, to the only gateway in the area in which the user equipment subscribes to the service. This is not limited in the present disclosure.

After the first device determines the gateway information, it is further included that the service of the user equipment is returned to the gateway (that is, the gateway in the area in which the user equipment subscribes to the service) corresponding to the gateway information, so that the gateway in the area in which the user equipment subscribes to the service provides a service such as charging and service management.

The first domain name includes the first information obtained by performing step S201. For example, the first domain name may be: first information.network indentifier-.country code.operator.network type.

In an example in which the first information is area information in a host name of the second device, the first domain name may be: sh.3gnet.APN.EPC.mnc002.mcc.460.3Gppnetwork.org, where sh indicates the first information and sh represents Shanghai.

In an example in which the first information is an area code in a number of the second device, the first domain name may be: 00011020.3gnet.APN.EPC.mnc002.mcc.460.3Gppnetwork.org, where "00011020." indicates the area code in the number of the second device.

It should be noted that a specific field of the first information in the first domain name, other information included in the first domain name, and the like are not limited in the present disclosure. Provided that the first domain name includes the first information, it falls within the protection scope of the present disclosure.

In this embodiment, a first device obtains first information of user equipment, where the first information of the user equipment is used to indicate an area in which the user equipment subscribes to a service, and the first device determines gateway information corresponding to a first domain name, where the first domain name includes the first information of the user equipment. The first domain name includes the first information of the user equipment, where the first information is used to indicate the area in which the user equipment subscribes to the service, that is, the first domain name is generated according to the area in which the user equipment subscribes to the service. Compared with a method in which a number segment is used to generate a domain name, this reduces a quantity of domain names that need to be configured and maintained, and reduces maintenance costs of an operator.

According to the technical solution in this embodiment of the present disclosure, data does not need to be separately configured in the case of mobile number portability, because a subscriber with mobile number portability needs to change a Subscriber Identity Module (SIM), and after the SIM card is changed, a host name in an HSS changes to an area in which user equipment subscribes to a service, without a need of considering an MSISDN number segment.

Figure 3:
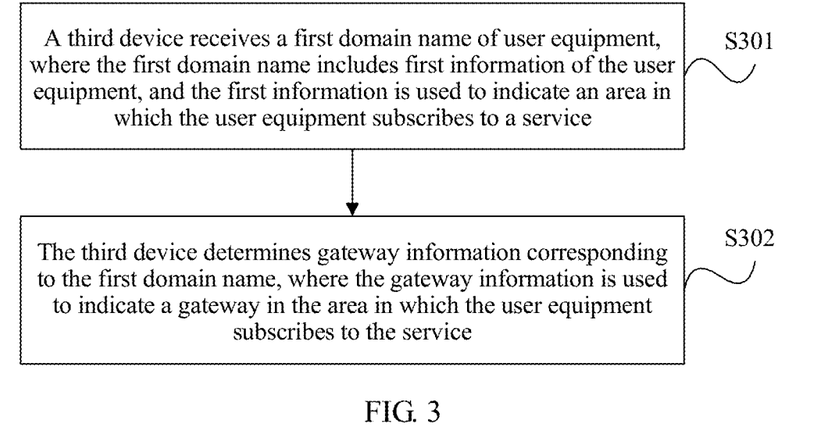
FIG. 3 is a schematic flowchart of Embodiment 2 of a method for determining gateway information according to the present disclosure.

FIG. 3 is a schematic flowchart of Embodiment 2 of a method for determining gateway information according to the present disclosure. The method in this embodiment is executed by a third device, where the third device may be a DNS. The method in this embodiment is as follows:

S301. The third device receives a first domain name of user equipment, where the first domain name includes first information of the user equipment, and the first information is used to indicate an area in which the user equipment subscribes to a service.

For detailed description of the first information, refer to the detailed description in S201 in the embodiment shown in FIG. 2. Details are not described herein again.

For detailed description of the first domain name, refer to the detailed description in S202 in the embodiment shown in FIG. 2. Details are not described herein again.

S302. The third device determines gateway information corresponding to the first domain name, where the gateway information is used to indicate a gateway in the area in which the user equipment subscribes to the service.

Specifically, that the third device determines gateway information corresponding to the first domain name includes:

The third device performs query in a first correspondence according to the first domain name, where a result of the query is the gateway information corresponding to the first domain name, the first correspondence includes a correspondence between the first domain name and the gateway information, and the first correspondence is stored in the third device.

The gateway information includes an identifier of the gateway, and the first information of the user equipment includes an index of a first-level administrative region including the area.

For detailed description of the first correspondence and the gateway information, refer to the detailed description in S202 in the embodiment shown in FIG. 2. Details are not described herein again.

In this embodiment, a third device receives a first domain name of user equipment, and queries corresponding gateway information in a first correspondence according to the first domain name. The first domain name includes first information of the user equipment, the first information is used to indicate an area in which the user equipment subscribes to a service, and the first domain name stored in the third device includes the first information used to indicate the area in which the user equipment subscribes to the service, that is, the first domain name is a domain name constituted according to the area in which the user equipment subscribes to the service. Compared with a method in which a number segment is used to generate a domain name, this reduces a quantity of domain names that need to be configured and maintained, and reduces maintenance costs of an operator.

Figure 4:
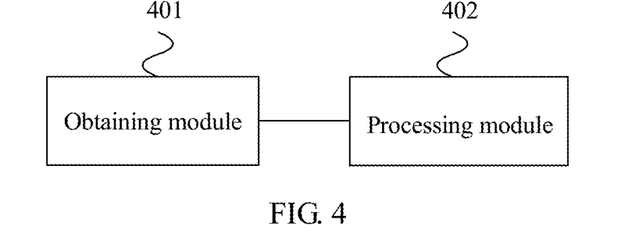
FIG. 4 is a schematic structural diagram of Embodiment 1 of an apparatus for determining gateway information according to the present disclosure.

FIG. 4 is a schematic structural diagram of Embodiment 1 of an apparatus for determining gateway information according to the present disclosure. The apparatus for determining gateway information in this embodiment may be deployed in an MME, an SGSN, an HSGW, a TGW, an SGW, or a PGW. The apparatus in this embodiment includes an obtaining module 401 and a processing module 402. The obtaining module 401 is configured to obtain first information of user equipment, where the first information of the user equipment is used to indicate an area in which the user equipment subscribes to a service. The processing module 402 is configured to determine gateway information corresponding to a first domain name, where the first domain name includes the first information of the user equipment, and the gateway information is used to indicate a gateway in the area.

In the foregoing embodiment, the processing module 402 is specifically configured to perform query in a first correspondence according to the first domain name, where a result of the query is the gateway information corresponding to the first domain name, and the first correspondence includes a correspondence between the first domain name and the gateway information.

Figure 5:
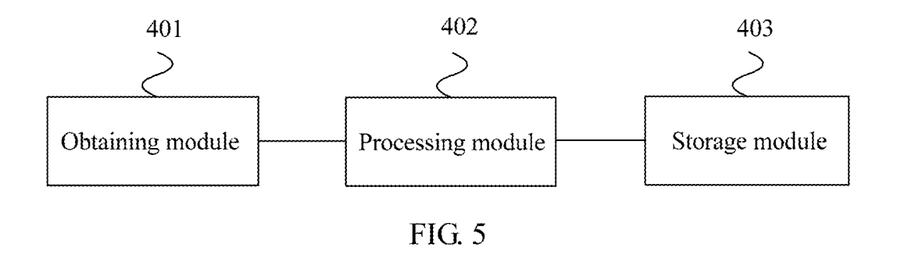
FIG. 5 is a schematic structural diagram of Embodiment 2 of an apparatus for determining gateway information according to the present disclosure.

FIG. 5 is a schematic structural diagram of Embodiment 2 of an apparatus for determining gateway information according to the present disclosure. On the basis of the embodiment shown in FIG. 4, FIG. 5 further includes a storage module 403. The storage module 403 is configured to store the first correspondence.

In the foregoing embodiment, the processing module 402 is specifically configured to: send the first domain name to a domain name server DNS, and receive the gateway information that is corresponding to the first domain name and that is sent by the DNS, where the DNS stores a correspondence between the first domain name and the gateway information.

In the foregoing embodiment, the obtaining module 401 is specifically configured to obtain the first information of the user equipment from a second device, where the second device is configured to store the first information.

In the foregoing embodiment, the obtaining module 401 is specifically configured to: obtain device information of the second device, and obtain the first information of the user equipment according to the device information of the second device.

In the foregoing embodiment, the device information of the second device is a host name of the second device or a number of the second device, and the first information is area information in the host name of the second device or an area code in the number of the second device.

In the foregoing embodiment, the second device is a home location register HLR, a home subscriber server HSS, an authentication, authorization and accounting AAA server, a policy and charging rules function PCRF unit, or an online charging system OCS.

In the foregoing embodiment, the gateway information includes an identifier of the gateway, and the first information of the user equipment includes an index of a first-level administrative region including the area.

In the foregoing apparatus embodiment, an obtaining module obtains first information of user equipment, where the first information of the user equipment is used to indicate an area in which the user equipment subscribes to a service; and a processing module determines gateway information corresponding to a first domain name, where the first domain name includes the first information of the user equipment. The first domain name includes the first information of the user equipment, where the first information is used to indicate the area in which the user equipment subscribes to the service, that is, the first domain name is generated according to the area in which the user equipment subscribes to the service. Compared with a method in which a number segment is used to generate a domain name, this reduces a quantity of domain names that need to be configured and maintained, and reduces maintenance costs of an operator.

Figure 6:
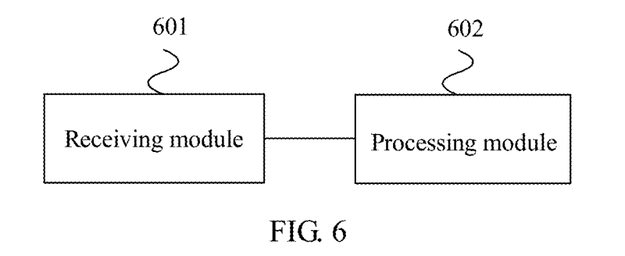
FIG. 6 is a schematic structural diagram of Embodiment 3 of an apparatus for determining gateway information according to the present disclosure.

FIG. 6 is a schematic structural diagram of Embodiment 3 of an apparatus for determining gateway information according to the present disclosure. The apparatus for determining gateway information in this embodiment may be deployed in a DNS. The apparatus in this embodiment includes a receiving module 601 and a processing module 602. The receiving module 601 is configured to receive a first domain name of user equipment, where the first domain name includes first information of the user equipment, and the first information is used to indicate an area in which the user equipment subscribes to a service. The processing module 602 is configured to determine gateway information corresponding to the first domain name, where the gateway information is used to indicate a gateway in the area.

In the foregoing embodiment, the processing module 602 is configured to perform query in a first correspondence according to the first domain name, where a result of the query is the gateway information corresponding to the first domain name, the first correspondence includes a correspondence between the first domain name and the gateway information, and the first correspondence is stored in the apparatus for determining gateway information.

In the foregoing embodiment, the gateway information includes an identifier of the gateway, and the first information of the user equipment includes an index of a first-level administrative region including the area.

In the foregoing apparatus embodiment, a receiving module receives a first domain name of user equipment, and a processing module queries corresponding gateway information in a first correspondence according to the first domain name. The first domain name includes first information of the user equipment, the first information is used to indicate an area in which the user equipment subscribes to a service, and the first domain name stored in the apparatus for determining gateway information includes the first information used to indicate the area in which the user equipment subscribes to the service, that is, the first domain name is a domain name constituted according to the area in which the user equipment subscribes to the service. Compared with a method in which a number segment is used to generate a domain name, this reduces a quantity of domain names that need to be configured and maintained, and reduces maintenance costs of an operator.

Figure 7:
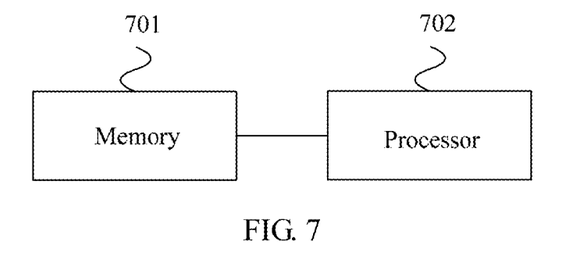
FIG. 7 is a schematic structural diagram of Embodiment 4 of an apparatus for determining gateway information according to the present disclosure.

FIG. 7 is a schematic structural diagram of Embodiment 4 of an apparatus for determining gateway information according to the present disclosure. The apparatus for determining gateway information in this embodiment may be deployed in an MME, an SGSN, an HSGW, a TGW, an SGW, or a PGW. As shown in FIG. 7, the apparatus in this embodiment includes a memory 701 and a processor 702. The memory 701 is configured to store code for executing a method for determining gateway information, and the processor 702 is configured to invoke the code to execute the following operations:

obtaining first information of user equipment, where the first information of the user equipment is used to indicate an area in which the user equipment subscribes to a service; and determining gateway information corresponding to a first domain name, where the first domain name includes the first information of the user equipment, and the gateway information is used to indicate a gateway in the area.

In the foregoing embodiment, the processor 702 is further configured to perform query in a first correspondence according to the first domain name, where a result of the query is the gateway information corresponding to the first domain name, and the first correspondence includes a correspondence between the first domain name and the gateway information.

In the foregoing embodiment, the memory 701 is configured to store the first correspondence.

In the foregoing embodiment, the processor 702 is further configured to: send the first domain name to a domain name server DNS, and receive the gateway information that is corresponding to the first domain name and that is sent by the DNS, where the DNS stores a correspondence between the first domain name and the gateway information.

In the foregoing embodiment, the processor 702 is further configured to obtain the first information of the user equipment from a second device, where the second device is configured to store the first information.

In the foregoing embodiment, the processor 702 is further configured to: obtain device information of the second device, and obtain the first information of the user equipment according to the device information of the second device.

In the foregoing embodiment, the device information of the second device is a host name of the second device or a number of the second device, and the first information is area information in the host name of the second device or an area code in the number of the second device.

In the foregoing embodiment, the second device is a home location register HLR, a home subscriber server HSS, an authentication, authorization and accounting AAA server, a policy and charging rules function PCRF unit, or an online charging system OCS.

In the foregoing embodiment, the gateway information includes an identifier of the gateway, and the first information of the user equipment includes an index of a first-level administrative region including the area.

Figure 8:
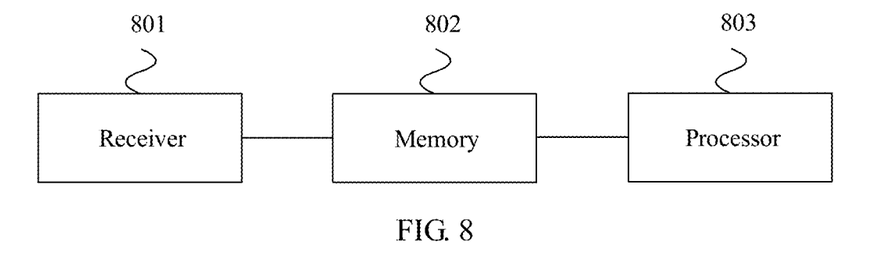
FIG. 8 is a schematic structural diagram of Embodiment 5 of an apparatus for determining gateway information according to the present disclosure.

FIG. 8 is a schematic structural diagram of Embodiment 5 of an apparatus for determining gateway information according to the present disclosure. The apparatus for determining gateway information in this embodiment may be deployed in a DNS. As shown in FIG. 8, the apparatus in this embodiment includes a receiver 801, a memory 802, and a processor 803. The receiver 801 is configured to receive a first domain name of user equipment, where the first domain name includes first information of the user equipment, and the first information is used to indicate an area in which the user equipment subscribes to a service. The memory 802 is configured to store code for executing a method for determining gateway information. The processor 803 is configured to invoke the code to execute the following operation:

determining gateway information corresponding to the first domain name, where the gateway information is used to indicate a gateway in the area.

In the foregoing embodiment, the processor 803 is further configured to perform query in a first correspondence according to the first domain name, where a result of the query is the gateway information corresponding to the first domain name, the first correspondence includes a correspondence between the first domain name and the gateway information, and the first correspondence is stored in the third device.

In the foregoing embodiment, the gateway information includes an identifier of the gateway, and the first information of the user equipment includes an index of a first-level administrative region including the area.

The apparatus embodiments of the present disclosure may refer to the method embodiments of the present disclosure, and may be configured to execute the method provided in the embodiments of the present disclosure.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for determining gateway information, the method comprising:
   obtaining, by a first device of a wireless communication network, first information of user equipment when the user equipment is in a roaming location in the wireless communication network, wherein the first information of the user equipment indicates a home location area in which the user equipment subscribes to a service, and comprises an index of a first-level administrative region in a country comprising the home location area, wherein obtaining, by the first device, the first information of user equipment further comprises:
      obtaining, by the first device, device information of a second device, and
      obtaining the first information of the user equipment according to the device information of the second device, and
      wherein the device information of the second device is a host name of the second device or a number of the second device, and
      the first information is area information in the host name of the second device or an area code in the number of the second device; and
   determining, by the first device, gateway information corresponding to a first domain name, wherein the first domain name comprises the first information of the user equipment, and the gateway information indicates a gateway in the home location area.

2. The method according to claim 1, wherein determining, by the first device, gateway information corresponding to a first domain name comprises:
performing, by the first device, a query in a first correspondence according to the first domain name, wherein a result of the query is the gateway information corresponding to the first domain name, and the first correspondence comprises a correspondence between the first domain name and the gateway information.

3. The method according to claim 2, wherein the first correspondence is stored in the first device.

4. The method according to claim 1, wherein determining, by the first device, gateway information corresponding to a first domain name comprises:
sending, by the first device, the first domain name to a domain name server (DNS); and
receiving, by the first device, the gateway information that corresponds to the first domain name and is sent by the DNS, wherein the DNS stores a correspondence between the first domain name and the gateway information.

5. The method according to claim 1, wherein obtaining, by a first device, first information of user equipment comprises:
receiving, from a second device, the first information of the user equipment, wherein the second device is configured to store the first information.

6. The method according to claim 1, wherein the first device is a mobility management entity, a serving general packet radio service support node, a high rate packet data serving gateway, a transparent gateway, a serving gateway, or a packet gateway.

7. The method according to claim 5, wherein the second device is a home location register, a home subscriber server, an authentication, authorization and accounting server, a policy and charging rules function unit, or an online charging system.

8. The method according to claim 1, wherein:
the gateway information comprises an identifier of the gateway.

9. An apparatus for determining gateway information, the apparatus comprising:
a memory; and
at least one processor coupled to the memory, and configured to:
obtain first information of user equipment when the user equipment is in a roaming location in a wireless communication network, wherein the first information of the user equipment indicates a home location area in which the user equipment subscribes to a service, and comprises an index of a first-level administrative region in a country comprising the home location area;
obtain device information of a second device; and
obtain the first information of the user equipment according to the device information of the second device,
wherein the device information of the second device is a host name of the second device or a number of the second device, and
the first information is area information in the host name of the second device or an area code in the number of the second device; and
determine gateway information corresponding to a first domain name, wherein the first domain name comprises the first information of the user equipment, and the gateway information indicates a gateway in the home location area.

10. The apparatus according to claim 9, wherein the at least one processor is further configured to:
perform a query in a first correspondence according to the first domain name, wherein a result of the query is the gateway information corresponding to the first domain name, and the first correspondence comprises a correspondence between the first domain name and the gateway information.

11. The apparatus according to claim 10, further comprising:
at least one memory configured to store the first correspondence.

12. The apparatus according to claim 9, wherein the at least one processor is further configured to:
send the first domain name to a domain name server (DNS); and
receive the gateway information that corresponds to the first domain name and is sent by the DNS, wherein the DNS stores a correspondence between the first domain name and the gateway information.

13. The apparatus according to claim 9, wherein the at least one processor is further configured to:
receive the first information of the user equipment from a second device, wherein the second device is configured to store the first information.

14. The apparatus according to claim 9, wherein the apparatus is deployed in a mobility management entity, a serving general packet radio service support node, a high rate packet data serving gateway, a transparent gateway, a serving gateway, or a packet gateway.

15. The apparatus according to claim 13, wherein the second device is a home location register, a home subscriber server, an authentication, authorization and accounting server, a policy and charging rules function unit, or an online charging system.

16. The apparatus according to claim 9, wherein:
the gateway information comprises an identifier of the gateway.

* * * * *